(12) United States Patent
Abramov et al.

(10) Patent No.: US 8,674,123 B2
(45) Date of Patent: Mar. 18, 2014

(54) METHOD FOR EXTRACTING MATERIALS AND DEVICE FOR IMPLEMENTING SAME

(75) Inventors: Yakov Kuzmich Abramov, Moscow (RU); Vladimir Mihailovich Veselov, Moscow (RU); Viktor Mihailovich Zalevsky, Moscow (RU); Vitaly Grigorevich Tamurka, Moscow (RU); Veniamin Sergeevich Volodin, Moskovskaya obl. (RU); Natalja Vladimirovna Veselova, Moskovskaya obl. (RU); Larisa Sergeevna Ermakova, Moscow (RU); Nina Semenovna Kondrashkina, Moscow (RU)

(73) Assignee: Twin Trading Company (RU)

( * ) Notice: Subject to any disclaimer, the term of this patent is extended or adjusted under 35 U.S.C. 154(b) by 349 days.

(21) Appl. No.: 13/138,038

(22) PCT Filed: Feb. 26, 2010

(86) PCT No.: PCT/RU2010/000090
§ 371 (c)(1),
(2), (4) Date: Oct. 26, 2011

(87) PCT Pub. No.: WO2010/082870
PCT Pub. Date: Jul. 22, 2010

(65) Prior Publication Data
US 2012/0071675 A1    Mar. 22, 2012

(30) Foreign Application Priority Data
Dec. 29, 2008 (RU) .................. 2008152177

(51) Int. Cl.
*C11B 1/10* (2006.01)
*C11B 1/14* (2006.01)
*B01D 11/02* (2006.01)

(52) U.S. Cl.
USPC ...... 554/22; 554/23; 554/8; 554/20; 554/207; 422/284; 422/291

(58) Field of Classification Search
None
See application file for complete search history.

(56) References Cited

FOREIGN PATENT DOCUMENTS

| | | |
|---|---|---|
| DE | 3228927 | 2/1984 |
| GB | 912326 | 12/1962 |
| GB | 1167673 | 10/1969 |
| RU | 2021836 | 10/1994 |
| RU | 2163827 | 1/2001 |
| RU | 2173557 | 9/2001 |
| RU | 2178708 | 1/2002 |
| RU | 2213606 | 10/2003 |
| RU | 2225242 | 10/2004 |
| SU | 856467 | 8/1981 |
| SU | 1286232 | 1/1987 |

*Primary Examiner* — Yate K Cutliff
(74) *Attorney, Agent, or Firm* — Kreydin Yefim

(57) ABSTRACT

The invention can be used for extraction of valuable biologically active agents from raw materials. The method of extraction comprises treating the raw materials by preliminary extraction with the extracting agent heated to the temperature not allowing denaturation of raw materials and the final product. The extracting agent is either distilled water or watered alcohol to carry out both the impregnation of raw material with the extracting agent and extraction in vacuum-impulsive mode in the extractor, to carry out catching of extract essential oils. The device for extraction comprises a screw dozer and continuous heated rolls with a vessel to receive press cake impregnated with the extracting agent, two parallel extractors, pipelines connected to a reflux condenser, a foam-destroying device, and vessels to store and prepare the extracting agent and the extract interconnected filters and condensers, additionally connected with a receiver which is equipped with a vacuum pump and pipelines.

12 Claims, 1 Drawing Sheet

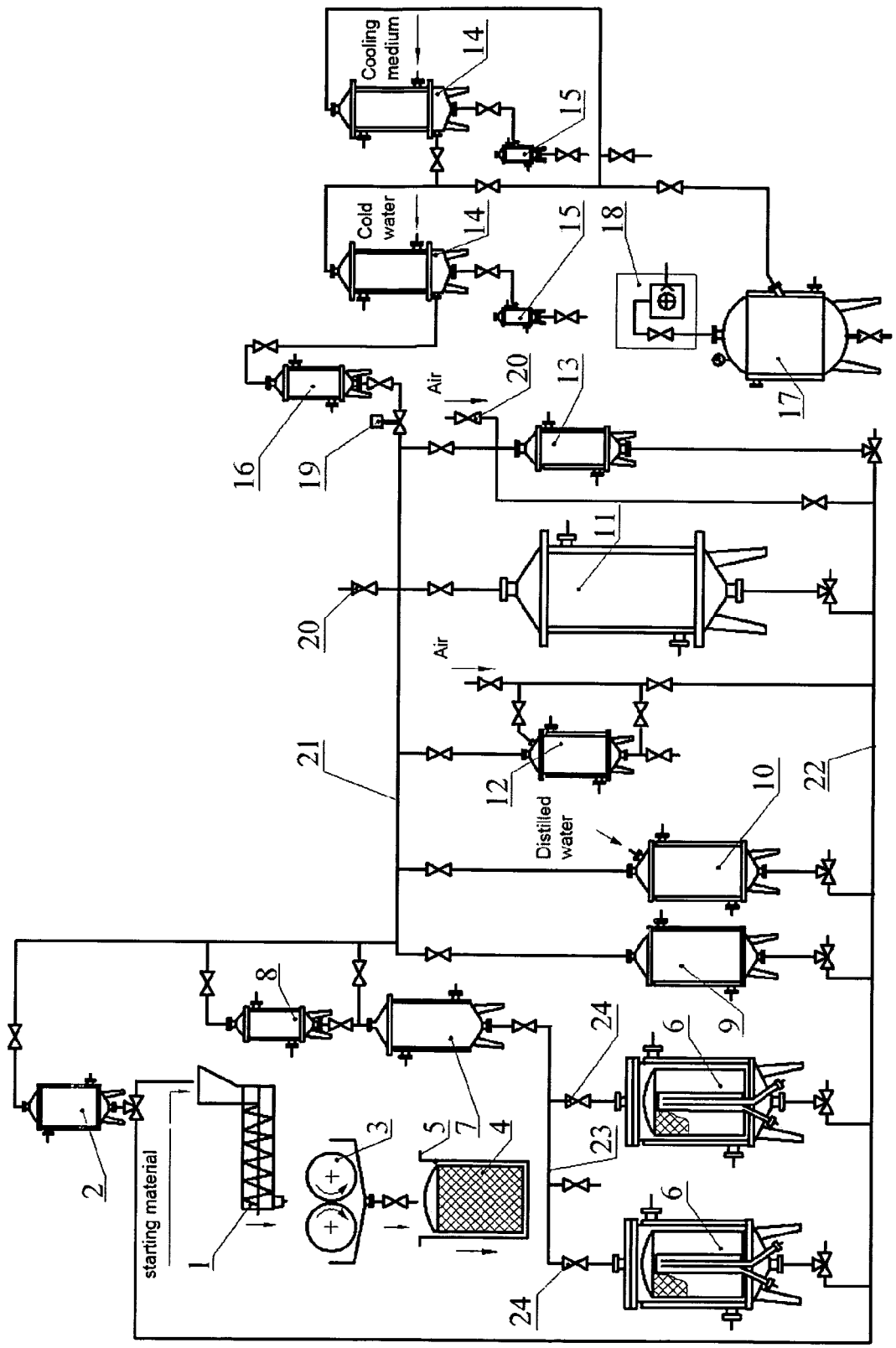

METHOD FOR EXTRACTING MATERIALS AND DEVICE FOR IMPLEMENTING SAME

This application is the United States national phase application of International Application PCT/RU2010/000090 filed Feb. 26, 2010, which claims the benefit of Russian Patent application No RU 2008152177 FILED Dec. 29, 2008, the entire disclosure of which is incorporated herein by reference.

THE TECHNICAL FIELD

The invented device works on extraction techniques with the help of vacuum and can be used for extraction of valuable biologically active agents from vegetable, animal, fish, seafood, and other raw materials, which are used in food and pharmaceutical industry.

THE TECHNICAL LEVEL

The currently used method of extraction (SU 1286232 B01D 11/02) comprises grinding and vacuum treatment evacuation of raw material to residual pressure of 20-30 Kpa with vacuum exposure, raw material and extracting agent mixing, heating of mixture to 40-80° C., periodic vacuum treatment evacuation of mixture and heat supply to maintain the temperature of mixture at 5-15° C. which is higher than the boiling point, vacuum exposure, and pressure increase to atmospheric level.

This method of extraction has certain operating restrictions: The method does not involve using extracting agents with a boiling point at the atmospheric pressure below 40° C. Moreover, the method can be used for extraction of raw materials of porous open-grain structure only.

The currently used method of extraction of raw materials is (RU 2213606 B01D 11/02). The method includes grinding and heating of raw materials, degassing of raw materials and extracting agent, heating of extracting agent to temperature of 5-15° C. below the temperature for the heating of raw materials. Degassing of raw materials and extracting agent is performed separately using an impulsive vacuum treatment, and every impulsive vacuum treatment cycle is followed by vacuum exposure for 3-5 minutes. The extraction is carried out in vacuum-impulsive mode at the temperature of 70° C. and residual pressure of 1-10 mm Hg in a receiver, including vacuum exposure for 5-10 minutes and simultaneous heating. Following the exposure, the pressure in extractor is raised to atmospheric level.

The described above method for materials extraction has several restrictions. As a result of the between the heated extraction agent and raw materials the mixture temperature decreases and this has a negative effect on the mixture's boiling rate at the following vacuum treatment. In this connection, the raw materials should be heated to a high temperature and this affects the quality of the obtained extracts. Besides, the preliminary degassing of extracting agent decreases the efficiency at the initial stage of extracting.

The device for extracting raw vegetable materials is currently in use (RU 2225242 B01D 11/02), comprising a body, a cylinder coaxial to the body, a shaft with agitator, a cover with the driver for agitator, connecting pipes and a bottom side. The body is equipped with a hatch with a squeezing device. On the cover a pulse chamber is installed, it is connected with the outer generator of pneumatic pressure pulses. However the extraction procedure in such device takes a lot of time (70-90 min) and needs high temperature (70-80° C.) and this negatively affects the quality of the obtained product.

The closest in technical essence and the achieved effect is the invention (RU 2163827 B01D 11/02) "The method for extraction of materials" taken as the closest analogue. The method envisages such stages as preparation of raw materials and extracting agent, a contact between components and extraction. Grinded and heated to a processing temperature (lower than the temperature of the product denaturation) the raw materials are degassed by means of impulsive vacuum treatment evacuation and a vacuum exposure for 1-3 min. As a result the gases from between particles, capillary spaces and surface of raw materials are removed. The prepared raw material is put at vacuum exposure upward, heated to the same temperature as the extracting agent, the extracting ratio (extracting agent:raw material)=10, then a quick vacuum relief is carried out, and the raw material are impregnated with the extracting agent. Then the mixture is heated at the atmospheric pressure, treated with impulsive vacuum evacuation and undergoes a vacuum exposure. Due to overheating of the raw material and the extracting agent the mixture is boiling and the diffusion of target components of raw material to extracting volume takes place. Following the extracting agent boiling-up, the system's pressure is raised to the atmospheric level, and the extractible mass is impregnated with the extracting agent.

The method envisages the following modes: when preparing and extracting the raw material—the vacuum treatment evacuation to the residual pressure of 0.1-13.3 Kpa with the cycle of obtaining vacuum and the relief—0.5-1.0 sec. and the vacuum exposure time—1.0-10.0 min. The extraction cycles should be carried out to obtain the maximum extraction yield of valuable components from the raw materials. The total extraction time is from 30 to 180 min.

The device, (patent RU 2213606 B01D 11/02) currently using this method of extraction is the closest analogue of the proposed device and comprises an extracting agent vessel and extractor, linked by a pipeline through quick-response valves and a condensate receiver and extractor and a vacuum pump connected to the receiver. A reflux condenser is installed over the extractor to condensate the extracting agent vapours, a heater and a pump for heating and supplying the heating medium to the jackets of the extracting agent's vessel and the extractor.

This method of extraction and the device have certain operating limits. At the offered operating modes of vacuum treatment evacuation, both the method and the device are generally used for extracting vegetable raw materials, and the extraction requires a large amount of extracting agent (the ratio extracting agent:raw materials=10), and often with the loss of valuable components such as essential oils. To achieve the maximum yield of valuable components, a number of cycles of vacuum-impulsive treatment evacuation is increased which results in power consumption increase.

DISCLOSURE OF THE INVENTION

The objective of this invention is the development of an extraction method and a device to increase the operating capacity of the procedure by creating conditions for extracting various types of biological raw materials using a minimum amount of an extracting agent with a simultaneous increase of the procedure's intensity, a yield of extractible biologically active substances and improvement of its quality and the yield of essential oils.

To solve these problems the method, comprising extracting agent heating, vacuum-impulsive impregnation of raw material with an extracting agent and extraction of raw material in a vacuum-impulsive mode at temperatures not causing denaturation of raw materials or its extractable components, requires that the raw materials should be preliminary extracted with an extracting agent and then undergo a vacuum-impulsive impregnation. The extracting agent should be either distilled water or watered alcohol with the concentration not less than 20% on the heated continuous rolls with the ratio (extracting agent:raw materials) not more than 2. Obtained after thermo-vacuum-impulsive extraction liquid extract is to undergo a vacuum-impulsive filtration, a low temperature evaporation in thermo-vacuum-impulsive mode to concentrate it and to prepare it for the followed drying. The essential oils obtained through extraction and evaporation, are caught in a vacuum line and are separated from water vapours in dedicated condensers according to their boiling points. The water surplus is caught with a drop catcher in a vacuum line.

To carry out this extraction method, a device comprising an extractor connected through valves to a pipeline with a reflux condenser, an extracting agent vessel and the accumulating vessel for extract is used. Moreover, all above-mentioned equipment is both interconnected and linked to a receiver, which in its turn is connected to a vacuum pump. At the inlet of extractor the device is equipped with a consecutively installed screw doser, connected through an intermediate vessel with the extracting agent's vessel and constantly heated rolls equipped with a receiving net container to collect press cake impregnated with the extracting agent. Two vacuum filters connected to the accumulating vessel for extract and the collection vessels with pipelines are part of the device. The device has two condensers cooled by various cooling medium; they are both interconnected and connected to the equipment through pipelines by a quick-response valve. Before the pipelines there is a drop catcher installed in the general vacuum line. To protect the vacuum line against extracting agent's foam, additionally, a foam-destroying device is installed above the reflux condenser. The foam-destroying device is connected to the general vacuum line. To provide continuity of the extracting procedure the device is equipped with the second extractor, installed parallel to the first one. The second extractor is connected thought valves to the reflux condenser and the extracting agent vessel.

Thus, the difference is in a different mode of preparation and contacting raw material and the extracting agent, in the different design of the device to carry out these changes, i.e. the invention has a feature of novelty.

When carrying out the preliminary extraction by means of continuous rolls, the fibrillar structure of raw materials undergoes a partial destruction due to shifting deformations, and this improves wetting and impregnation of raw materials and creates conditions for the following more effective and intense extraction with a lower amount of extracting agent used. During the following thermo-vacuum-impulsive extraction of raw material, filtration and concentration (evaporating) of obtained extract, the valuable highly volatile essential oils are evolved. To avoid their loss, the essential oils are caught, isolated from water vapours in condensers and collected in a vessel. This procedure increases the total yield of biologically active agents. Vacuum-impulsive filtration of the extract enables to increase the quality of its treatment that is to increase the quality of the final product.

The technical result, achieved by the above listed features leads to intensification and higher effectiveness of the extraction procedure at a lower cost of the extracting agent, improvement of quality and yield of the extractable components.

IMPLEMENTATION OF THE INVENTION

The drawing shows the device for extraction of materials comprising a screw dozer 1, to the hopper of which the raw materials are delivered and the extracting agent is dosed from the intermediate vessel 2. To carry out the preliminary extracting procedure the rolls 3 are installed under the screw dozer. After the rolls, the press cake impregnated with the extracting agent is collected in the receiving net container 4 of the vessel 5. To carry out the extraction procedure the device is equipped with extractors 6 in which a container with the initial press cake is installed. The reflux condenser 7 is installed above extractors, to which it is connected through the general line 23 with valves 24. A foam-destroying device 8 is installed above the reflux condenser. The extracting agent is delivered to the intermediate vessel and extractors from extracting agent vessel 9. The obtained extract is collected in the accumulating vessel for the extract 10, and following the vacuum-impulsive filtration is delivered to the collecting vessel 11. The product is filtrated in the net filter 12, and ceramic or metal-ceramic filters 13. Vapours of water and essential oils of extract are condensed in two condensers 14, cooled with water and cooling medium respectively and connected to collecting vessels 15. Water drops are caught by the drop catcher 16. All equipment and the receiver 17 are interconnected with pipelines. In receiver, vacuum is provided with the pump 18 through a quick-response valve 18, and vented to the atmosphere through valve 20. Every device of the unit is equipped with valves connecting to the vacuum line 21 and the general line 22 (see the drawing).

The extraction device operates in the following way:
The Preparation of Raw Material and Extracting Agent.

The raw materials are washed and cleaned of impurities.

The extracting agent is heated in vessel 9 to operating temperature, which is below the denaturation temperature of quality characteristics of raw materials valuable components. The extracting agent is either distilled water or watered alcohol with alcohol concentration not less than 20%. Lower alcohol concentration can result in mould occurring on the raw material to be extracted and the final product.

Rolling of the Prepared Raw Materials

Prepared raw materials are supplied to heated continuous rollers 3 with the screw dozer 1. Dosage of heated extracting agent in required amount to ensure the extraction ratio (extracting agent:raw materials not more than 2) is carried out simultaneously to the hopper of screw dozer through the intermediate vessel 2. On rolls, the mixture of raw materials and the extracting agent is heated. The raw materials are grinded due to shearing deformation, are intensively mixed and preliminary extracted with the extracting agent. Due to extracting agent absorption by the grinded raw material, at shearing deformation, the extraction procedure continues up to start of pressing of raw materials with rolls. When grinding the raw materials, the partial destruction of fibrillar structure of material and part of membranous walls occurs. At following vacuum-impulsive impregnation of raw material with extracting agent, the diffusion of extracting agent to material structure is increased and intensified leading to the yield increase of extractable components.

Vacuum-Impulsive Impregnation of Material

The receiving net container 4 filled with the obtained, heated with rolls initial press cake and mixed with the extracting agent is installed in one of extractors 6 equipped with a heating jacket. The extractor is connected with the exhaust cart by means of a vacuum line with the quick-response valve 19. In the device, two extractors are envisaged to ensure the procedure continuity. While mixture heating is carried out in one extractor, the vacuum treatment evacuation is carried out in another extractor and vice versa. The heated extracting agent is delivered to the extractor from the extracting agent vessel 9 so that the ratio (extracting agent:raw material) was not more than 4. Then a quick vacuum relief is carried out (for 0.5-1.0 sec.) and the mixture is exposed to a vacuum treatment evacuation for 1-3 min. Then extractor is connected to the atmosphere. During the impregnation of raw material the residual gases and vapours are removed from the surface and inner layers of raw materials, the surface area is increased which enables the efficiency of the following vacuum-impulsive extraction.

Extraction

Thermo-vacuum-impulsive extraction is carried out at operating temperature. Preliminary extraction on rolls enables to carry out the extraction procedure at extraction ratio not more than 4. The mixture is heated, and then impulsive vacuum treatment evacuation of the mixture is carried out according to set-up parameters (vacuum rate, mixture temperature, extraction ratio). The receiver 17 is connected to, and pumps 18 provide vacuum rate to 1.3 Kpa.

Impulse duration of a vacuum build-up from the receiver to the extractor totals 0.5-1.0 sec. Fibrillar membrane structure of the material is partly destroyed. Depending on the type of extractable material the mixture is vacuum exposed for 1-5 min. Intense boiling of mixture occurs, at that extracting agent boils not only in the mixture's volume, but also inside extractable material and this is accompanied by both intense thermal- and mass transfer as well as transfer of material into the extracting agent. The extracting agent is partly evaporated, as a result of which the temperature of the mixture is decreased and boiling consequently stops. Upon completion of mixture vacuum exposing, a quick vacuum relief is carried out for 3 sec. (valve 19 of vacuum line 21 is closed and valve 20 of atmosphere line is open). During this period, the extracting material penetrates deeper into the structure of the material. The number of extraction cycles depends upon the types of raw materials and is carried out 3-5 times.

Vacuum-Impulsive Filtration of Extract

The obtained extract is delivered to either net 12 or ceramic 13 filters from the vessel 10 by means of vacuum. The filtration of extract with filter is carried out in a vacuum-impulsive mode. The extract is cleared against residuals of press cake and following the filtration is delivered into the collecting vessel 11.

The Extract Concentration

To obtain concentrated and dried extracts the extract is evaporated in vessel 11. For this purpose vessel 11 is connected with a vacuum line by means of opening a quick-response valve 19. Water from vacuum line is caught with a drop catcher 16. Water vapour of the extract is condensed in the condenser 14 cooled by cold water and essential oils are caught with condenser 14 cooled with a cooling medium. The condensate from condensers is collected in collecting vessels 15. Wetted concentrated extract is sent for drying to obtain the required residual moisture. In pipelines and vessels the transportation of the extract and the extracting agent is carried out by means of vacuum without any dedicated mechanical dispensing equipment.

Examples of extraction of vegetable and animal raw materials are shown below.

Liquorice Extraction 0.5 kg of cleaned liquorice root was placed into a hopper of a screw dozer. The liquorice mass was covered with the extracting agent (distilled water) heated to the temperature of 40° C. (extraction ratio is 2). The mixture was delivered with screw dozer to heated rolls, which maintained the temperature of mixture at 40° C., and rolled it during 3 min. An additional amount of the heated extracting agent (extracting ratio is 4) was added. The obtained from rolls press cake of added extracting agent has undergone impulse vacuum treatment evacuation for 5 sec to the residual pressure of 1.3 Kpa, exposed at this pressure for 2 min and then relieved vacuum. The mass cooled down during the vacuum treatment procedure was heated up to 40° C. for 3 min at the atmospheric pressure. Three cycles were carried out: mixture heating, vacuum build-up, vacuum exposure for 3 min., a quick vacuum relief, and mixture exposure at the atmospheric pressure. The total time of extraction was 15 min. The extract obtained after filtration completely met the requirement of GOST 22840-77 "The Extract of Liquorice". Extraction time decreased fourfold, and the amount of the used extraction agent was 1.5 times less as compared to the closest analogue.

Extraction of Brier 0.5 kg of rose hip was placed into a hopper of a screw dozer, covered with the extracting agent (water) heated to 56° C. at extraction rate 1.5, then rolled by means of heated to 56° C. rolls for 3 min. The obtained mass was placed into the extractor and residual part of extraction agent (extraction rate=4) was added. The mixture was extracted at the residual pressure 1.3 Kpa and vacuum build-up rate for 0.5 sec. and vacuum exposure for 2 min. The mass was cooled to 25° C. Then the mass was heated to 56° C. for 3 min. at atmospheric pressure, and the cycles of extraction were repeated. The number of cycles of extraction was 3, and total time of extraction—20 min. Extraction time decreased threefold and the amount of used extracting agent decreased as well. The quality of the obtained extract met the requirements of TU 9370-022-02068315. Besides, brier essential oils were caught.

Extraction of Burdock Root (Agrimony Root)

0.5 kg of cleaned and dried burdock root was covered with heated to 50-55° C. extracting agent (distilled water, extraction ratio 1) in the hopper of a screw dozer, and the mixture was applied on rolls. The mixture was rolled during 5 min. During this time, mucus on root surface was destroyed which intensified the following procedure of thermo-vacuum-impulsive extraction. The obtained press cake was mixed with remaining portion of extracting agent (extracting rate=4) in extractor and impulsive-vacuum treatment evacuation of mixture was carried out. Following vacuum build-up for 0.5 sec. and vacuum exposure for 3 min the vacuum relief was carried out for 0.5 sec. Then the mass was heated to до 50-55° C. during 3 min. and the extraction cycle was repeated. The total time of extraction was 30 min. The rolling procedure enabled to intensify the procedure of burdock root extraction that led to decrease of extraction time fivefold. The quality of product met TU.

Extraction of Pig Cerebrum 0.5 kg of pig cerebrum was placed into the hopper of a screw dozer, and heated to 37-39° C., the extracting agent (watered alcohol, alcohol concentration 20%, extracting ratio 1) was delivered in doses. The mixture was rolled for 2 min. to obtain homogeneous mass. The container with mass was placed into an extractor and remaining portion of the extracting agent (extraction rate 2) was added in doses. The mixture was impulsive-vacuum evacuated treated for 0.5 sec., vacuum exposed for 4 min., then vacuum relief was carried out and the mixture was atmospheric pressure exposed for 2 min. with simultaneous heating to 37-39° C. The extraction cycle was repeated 4 times. The total time of extraction was 30 min. The yield of cerebrolysin was increased by 1.5 times.

Extraction of Bone Material 0.5 kg of lamb bones (ribs) with the heated to 50-55° C. distilled water (extracting ratio=2) was rolled on heated rolls for 5 min. Thoroughly grinded mass in a container was placed into an extractor, and an additional amount of extracting agent (extracting ratio=4) was added. The mass was impulsive-vacuum evacuation treated, vacuum exposed for 4 min, vacuum relieved, exposed to the atmospheric pressure for 4 min with simultaneous heating of mass to 50-55° C. The extraction cycle was repeated 5 times. The total time of extraction was 30 min. After being poured into mould boxes, the cooled blocks kept the form and were packed in aluminium foil with a manufacturing label. The obtained extract was a saturated bone soup containing 1.5 as much of components as compared to the one used in food industry.

6. Extraction of Fish 0.5 kg of fresh, scaled and cut salmon with heated to 37-38° C. extracting agent (watered alcohol, alcohol concentration 20%, and extracting ratio 1) was placed into the hopper of a screw dozer. Then the mixture was applied on rolls and rolled for 4 min. The mass in a container was placed into the extractor, and an additional amount of distilled water (extracting ratio=2) was added. The mixture was impulsive-vacuum evacuated treated for 0.5 sec., vacuum exposed for 3 min., and then vacuum relief was carried out. The mixture was heated to 37-38° C. for 2 min. at the atmospheric pressure. The thermo-vacuum-impulsive cycle was repeated 4 times. The total time of extraction was 20 min. Following pressing by means of press, the yield of the extracted component (fish oil) increased by 1.4-1.7 times.

The invention claimed is:

1. A method for extraction of materials comprising
   heating of an extracting agent,
   vacuum-impulsive impregnating of raw materials with the extracting agent and
   extracting of raw materials in thermo-vacuum-impulsive mode at temperature ranges not leading to denaturation of raw materials and final products, wherein
   before vacuum-impulsive impregnating the raw materials being preliminary extracted by means of heated rolls with the extracting agent at extracting ratio (extracting agent:raw materials) not more than 2, and wherein
   the extracting agent is distilled water and
   an obtained extract of the thermo-vacuum-impulsive mode having undergone a vacuum-impulsive filtration.

2. The method of claim 1 wherein essential oils of the extract are caught and isolated from water vapour according to boiling points in dedicated condensers, and water drops in pipelines are caught with a drop catcher.

3. The method claim 1 wherein after vacuum impulsive filtration the obtained extract underwent low temperature evaporation in the thermo-vacuum-impulsive mode.

4. A method for extraction of materials comprising
   heating of an extracting agent,
   vacuum-impulsive impregnating of raw materials with the extracting agent and
   extracting of raw materials in thermo-vacuum-impulsive mode at temperature ranges not leading to denaturation of raw material and final product, wherein
   before vacuum-impulsive impregnating the raw materials being preliminary extracted by means of heated rolls with the extracting agent at extracting ratio (extracting agent:raw materials) not more than 2, and wherein
   the extracting agent is watered alcohol of concentration not less than 20%, and an obtained extract of the thermo-vacuum-impulsive mode having undergone a vacuum-impulsive filtration.

5. The method of claim 4 wherein essential oils of the extract are caught and isolated from water vapour according to boiling points in dedicated condensers, and water drops in pipelines are caught with a drop catcher.

6. The method of claim 4 wherein after vacuum-impulsive filtration the obtained extrac underwent low temperature evaporation in the thermo-vacuum-impulsive mode after vacuum filtration.

7. A device for extraction of materials comprising extractor connected by a pipeline with valves with a reflux condenser, an extracting agent vessel and an collecting vessel interconnected and linked to a receiver, which is connected to a vacuum pump,
   wherein, the device is equipped at an inlet of the extractor with a consecutively installed screw dozer connected through an intermediate vessel to the extracting agent vessel and constantly heated rolls said constantly heated rolls are equipped with a receiving net container to collect press cake impregnated with the extracting agent and with two vacuum filters, connected with an accumulation vessel for an obtained extract.

8. The device of claim 7 wherein the device comprising a drop catcher and two condensers, cooled with various cooling medium, said drop catcher and two condensers are interconnected and connected with the pipeline through a quick-response valve.

9. The device of claim 7 wherein the device is equipped with a foam-destroying unit installed above the reflux condenser, and connected with the reflux condenser and the receiver by an additional pipeline through quick-response valves.

10. The device of claim 7 wherein the device is equipped with a second extractor installed parallel to the first extractor and connected through valves to the reflux condenser and the extracting agent vessel.

11. The device of claim 8 wherein the device is equipped with a second extractor installed parallel to the first extractor and connected through valves to the reflux condenser and the extracting agent vessel.

12. The device of claim 9, wherein the device is equipped with a second extractor installed parallel to the first extractor and connected through valves to the reflux condenser and the extracting agent vessel.

* * * * *